Search Room
BEST AVAILABLE COPY
Feb. 16, 1937. T. L. DUNBAR ET AL Re. 20,267
Orig. 1,888,632
DIGESTING PROCESS AND APPARATUS
Original Filed April 8, 1931 3 Sheets-Sheet 1
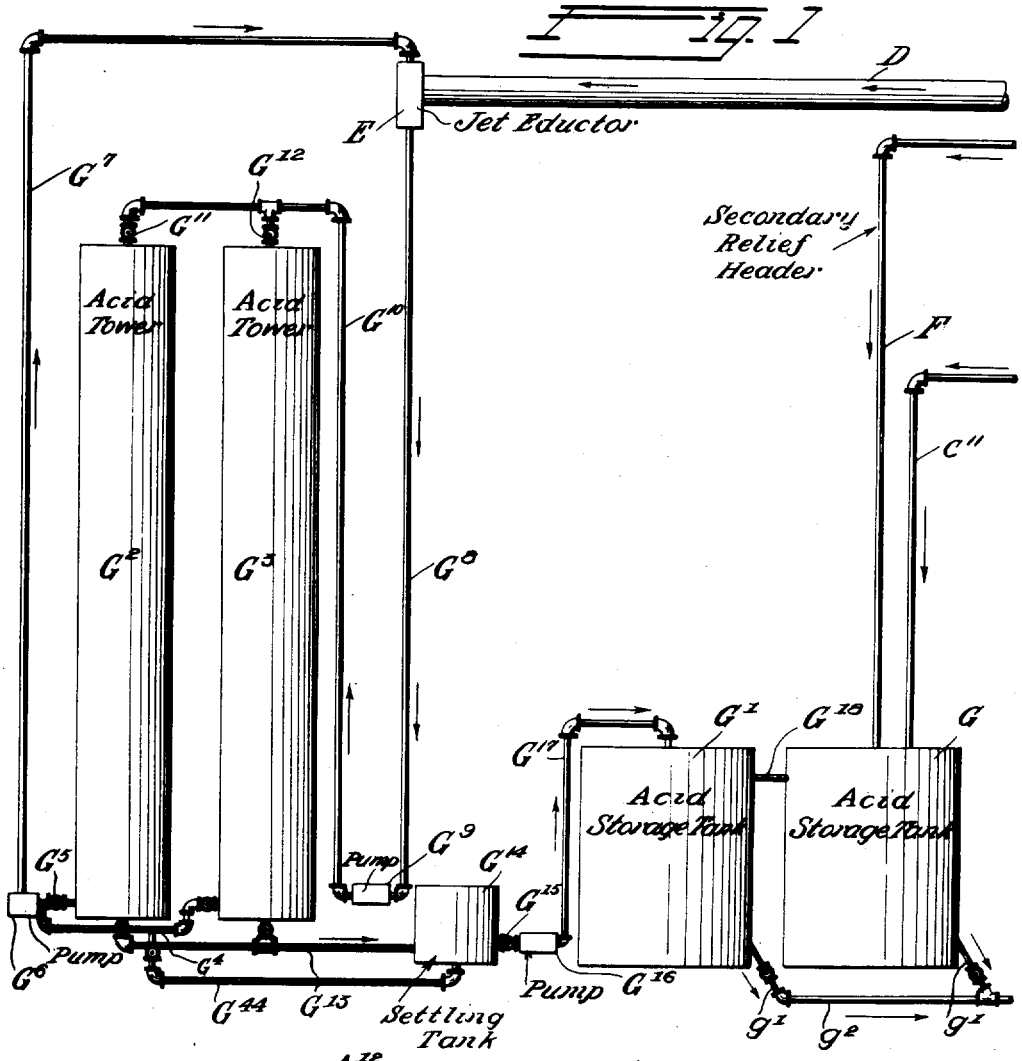
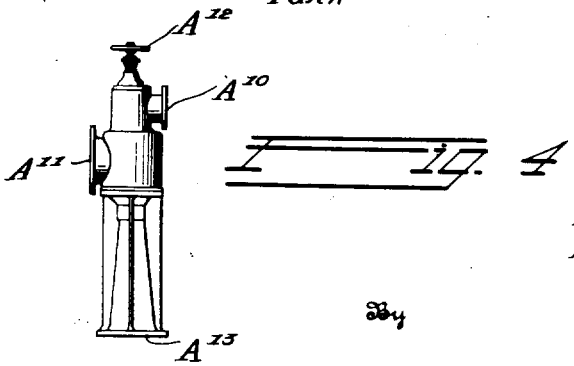
Inventors
T. L. Dunbar
A. D. Merrill
By
Robt. E. Barry
Attorney

PAPER MAKING AND
FIBER LIBERATION

Feb. 16, 1937. T. L. DUNBAR ET AL Re. 20,267

DIGESTING PROCESS AND APPARATUS

Original Filed April 8, 1931 3 Sheets-Sheet 2

Inventors
T. L. Dunbar
A. D. Merrill

Robt. E. Barry
Attorney

PAPER MAKING AND
FIBER LIBERATION

Search Room

Feb. 16, 1937. T. L. DUNBAR ET AL Re. 20,267

DIGESTING PROCESS AND APPARATUS

Original Filed April 8, 1931 3 Sheets-Sheet 3

Inventors
T. L. Dunbar
A. D. Merrill

By
Robt. E. Barry
Attorney

92. PAPER MAKING AND
FIBER LIBERATION

Reissued Feb. 16, 1937

Re. 20,267

UNITED STATES PATENT OFFICE 20,267

DIGESTING PROCESS AND APPARATUS

Thomas Leonidas Dunbar and Albert Darius Merrill, Watertown, N. Y.

Original No. 1,888,632, dated November 22, 1932, Serial No. 528,696, April 8, 1931. Application for reissue November 21, 1934, Serial No. 754,194

49 Claims. (Cl. 92—11)

This invention relates to an improved method and apparatus for digesting fibrous material, such as wood chips.

In the digestion of fibrous material, it has been proposed heretofore that the fluids vented from the digesters during cooking be used either directly or indirectly for preheating and preconditioning the fresh acid liquor to be employed in a subsequent cook. In some of these prior proposals, the relief or vented fluids are discharged into one or more headers that are in communication with one or more pressure accumulators containing fresh acid liquor.

One of the objects of the present invention is to combine with such a relief header, means for maintaining a vacuum or sub-atmospheric pressure in the header, whereby the digesters are relieved without building up any varying back pressures on the digesters. This facilitates the maintenance of desired pressures in the digesters during cooking.

Another object is to combine with the accumulator, means for maintaining within the same a substantially constant temperature and superatmospheric pressure, and to also maintain the liquor within the accumulator at a substantially uniform acid strength, so that the preconditioned and preheated liquor pumped into any digester after the latter has been charged with chips, will be of substantially the same acid strength and of substantially the same temperature and pressure in each case.

A further object of the invention is to provide a digesting system by which the fibrous material may be cooked with high strength acids. With the system, we are able to use cooking acid of a strength as high as 18% to 20% free, and may do this with great economy. By using such high strength acids, it is practical to reduce the maximum temperatures in the digester to from 115° C. to 120° C., and at the same time to recover the gases which are in the liquor when the digester is emptied. When cooking with such high strength acid, and at relatively low temperatures, the liquor blown from the digesters with the pulp, has a relatively high $SO_2$ content, and therefore, in our system, the blow-pits, vomit stacks and blow-pit relief line are all of acid proof construction, and are made air-tight so that no gases escape.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is an elevation of one end portion of our novel apparatus.

Fig. 4 is an elevation of a suitable type of jet eductor which we use in the apparatus.

Figure 2:
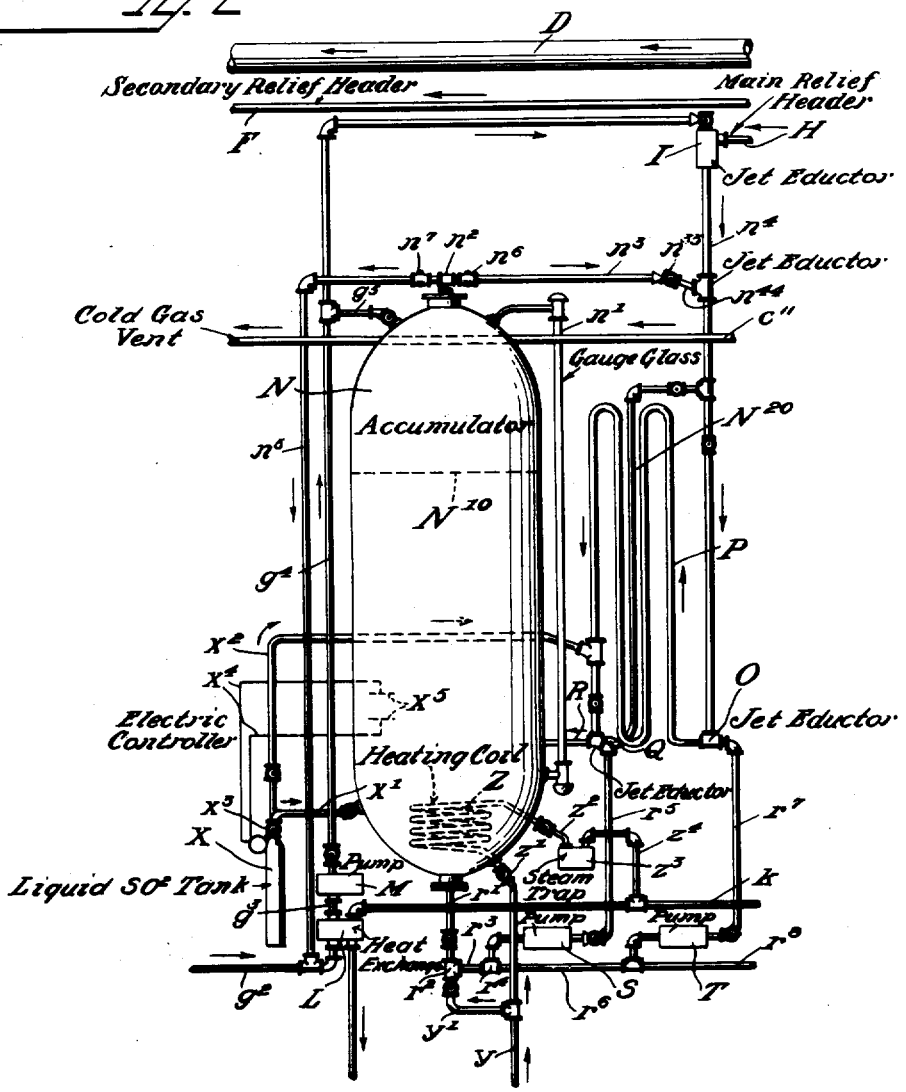
Fig. 2 is a similar view of the medial portion of the same.
Figure 3:
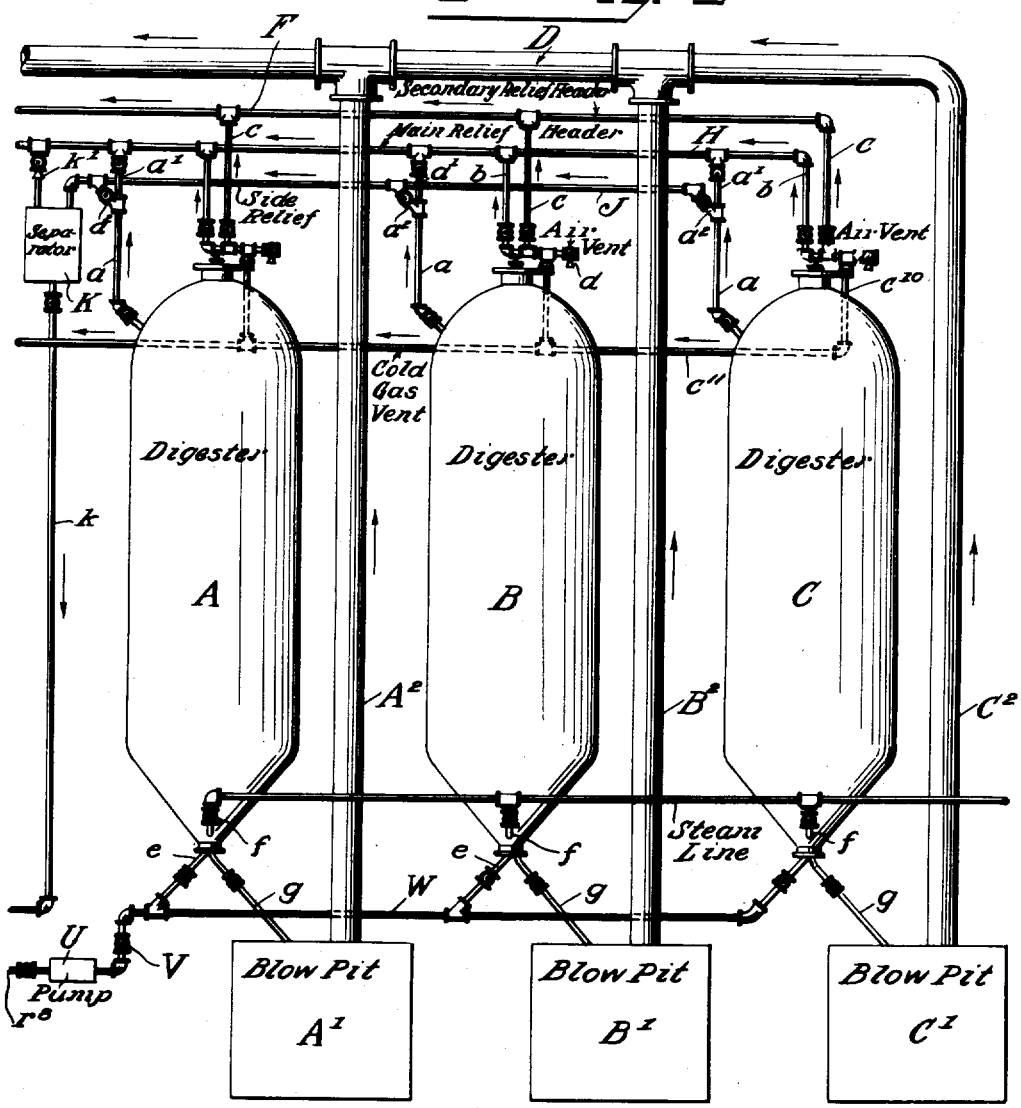
Fig. 3 is an elevation of the other end portion of the apparatus.

In the drawings A, B and C designate digesters, each having a blow-pit, designated respectively A', B' and C'. Vomit stacks A2, B2 and C2 lead from the blow-pits to a relief header D that conveys blow-pit gases and vapors to a jet eductor E. Each digester is provided with a valved side relief branch (*a*), a valved high pressure relief branch (*b*), a valved low pressure relief branch (*c*) and a valved air vent (*d*). Each digester also has at its lower end a valved cooking liquor entrance branch (*e*), a valved steam admission branch (*f*), and a valved blow-pit discharge branch (*g*). The branches (*c*) discharge into a secondary relief header F which leads to the acid storage tank G.

Each high pressure branch (*b*) discharges into a header H which leads to a jet eductor I.

The side relief branches are also connected with this header by means of valved branches *a'*. The pipes (*a*) also communicate with another header J by means of valved branches *a2*, and the header J discharges into a separator K.

From the separator, waste liquid may flow through a valved pipe (*k*) on its way to a sewer, and in its passage, it can travel through a heat exchanger L for imparting its heat units to fresh acid liquor which also flows through this heat exchanger.

Gases from the separator K pass by way of valved branch *k'* into the main relief header H.

Referring now to Figs. 1 and 2, it will be observed that acid from either one of the storage tanks G, G' can flow through valved branches *g'* into a header *g2* which leads to the heat exchanger L. After flowing through the heat exchanger, the fresh liquor flows through a pipe *g3* into the intake of a pump M which forces it through a valved pipe *g4* that leads to the jet eductor I. This pipe has a valved branch *g5* for feeding fresh liquor into the top of an accumulator N. The latter has a gauge glass *n'*, and a gas outlet *n2* at its top. This outlet communicates by a valved branch *n3* with a down pipe *n4* leading from the jet eductor I, and another valved pipe $n5$ leads from the outlet for discharging gases into the cold liquor line $g2$. The pipes $n3$ and $n5$ are equipped with back pressure valves $n6$, $n7$. The valve $n6$ is loaded say to discharge gases when the pressure in the accumulator reaches 45 pounds, and the valve $n7$ is loaded so as to release gases if the pressure reaches 50 pounds.

Pipe $n4$ leads to a jet eductor O which discharges into a trap pipe P that in turn empties into a jet eductor Q that discharges into a pipe R that leads into the accumulator.

Accumulator liquor may be recirculated through a valved branch $r'$ that leads from the bottom of the accumulator to a T-connection $r2$. The T-connection is joined by a pipe $r3$ and another connection $r4$ which is in turn connected to a valve pipe $r5$ that leads to the jet eductor Q and is provided with an interposed pump S.

A pipe $r6$ leads from the connection $r4$, and this pipe is connected by a valved conduit $r7$ to the jet eductor O. When desired, accumulator liquor may be fed by the pipe $r7$ which has an interposed pump T into the jet eductor.

Accumulator liquor may also be fed by the pipe $r6$ to a valved pipe $r8$ that discharges into a pump U. This pump forces the liquor through a valved pipe V into a header W that is connected to the liquor inlet branches ($d$) of the digesters.

$SO_2$ may be fed from a tank X into the accumulator through a valved conduit $x'$, or it may be fed from this tank into the trap pipe P by means of valved conduit $x2$. The tank may have an automatic control valve $x3$, and the wires $x4$ from the electric control will lead into the accumulator to electrode plates, as indicated at $x5$, so that the strength of the liquor in the accumulator may be employed to open or close the valve $x3$ for the purpose of automatically introducing $SO_2$, either into the accumulator or trap pipe P or both.

Steam, controlled thermostatically by the temperature within the accumulator, may be fed directly into the accumulator by a pipe Y that is connected by a valved branch $y'$ to the pipe $r'$, or the accumulator may be indirectly heated by a coil Z arranged within the same. The inlet of this coil is connected by a valved pipe $z'$ to the steam pipe Y, and the valved outlet pipe $z2$ of the coil leads to a steam trap $z3$. Condensate from this trap may flow by a pipe $z4$ into the waste liquor pipe ($k$), so that the heated condensate may also impart its heat units to the fresh acid liquor flowing through the heat exchanger L.

Referring now more particularly to Fig. 1, it will be observed that liquid from the bottom of either of the acid towers G2, G3 can flow by way of valved branches G4, G5 into a pump G6 which forces the same through a pipe G7 that leads to the jet eductor E. This liquid, after absorbing gases and vapors in the eductor, flows through a down pipe G8, and is forced by a pump G9 through a pipe G10 that is connected to valved branches G11 and G12 which discharge into the tops of the acid towers.

Liquor from the acid tower G3 is discharged through a valved pipe G13 into a settling tank G14 that is connected by a valved conduit G15 with a pump G16 which forces the liquor through a pipe G17 into the top of the tank G1.

A valved conduit G44 leads from the bottom of the settling tank G14 to the pipe G4, so that the pump G6 may also draw acid liquor from the settling tank or any other suitable storage tank and feed it to the jet eductor E.

It will be observed that the acid storage tanks communicate by means of a pipe G18.

The jet eductors may be of any suitable type, such as shown in Fig. 4. For example, it will have a liquid intake A10, and a gas and vapor intake A11, and the flow of the liquid will be controlled by an internal regulating valve through the instrumentality of a handle A12. The mixed fluids will be discharged at A13.

In operation, it will be assumed that fibrous material, in digesters B and C is being cooked with bi-sulphite liquor or the like, and the digester A has just been filled with chips from a bin (not shown) located over the digester. The cover of the digester A is clamped on and hot cooking liquor is pumped out of the accumulator N through the pipes $r'$ and $r8$ by the pump U, and this pump forces it through the conduit V and the branch pipe ($e$) into the bottom portion of the digester. This digester is pumped completely full of hot liquor, and during the first portion of the introduction of the liquor, the valves in the branches $a$, $b$ and $c$ are closed and the valve of the air vent ($d$) is left open until gas appears, whereupon said valve is closed. The valve in the branch $c10$ is opened and the gas which arises from the liquor during the continuation of the filling operation is vented through the branch $c10$ into the header $c11$ and carried by this header to the storage tank G in which they are absorbed by the acid in the tank. The acid in this tank is always maintained at a higher level than the discharge end of the header by means of the overflow conduit G18 which connects the two tanks.

After the digester A has been completely filled with the chips and liquor, the pump U is kept running until a liquor pressure equivalent to the ordinary cooking pressure has been created. Normally, this will mean that a pressure from 70 to 80 lbs. will be pumped on the digester, and at this time the valve in the line $r'$, the valve in the pipe V, and the valve in the branch ($e$) will be closed, and the pump U will be stopped. Now, steam is turned into the bottom of digester A through the branch ($f$), and during the steam admission, some of the liquor will be relieved from the top of the digester, through the branch ($b$), and will flow into the header H until a temperature of not less than about 112° C. has been reached, whereupon the valve in the branch ($b$) is closed, and the valve in the side relief branch ($a$) is opened, so that this relief liquor will now pass through the branch $a'$ into the main relief header H. From this header, the relief fluid will flow directly into the jet eductor I, and from the latter it will descend by means of the drop leg $n4$ and by way of the pipes P and R into the accumulator N. If, when a temperature of 125° C. is reached in digester A, all the liquor has not been relieved down to the point where the side relief branch ($a$) is attached to the digester, and this liquor on analysis is shown to be weak, the valve in the branch $a'$ is closed, and the valve in the branch $a2$ is opened, so that the relief fluid enters the header J and flows into the separator K. The valve in the pipe $k'$ is then opened, and any gases coming off from the separator are conducted to the main header H, these gases eventually being led first to the eductor I and thence to the accumulator. The waste weak liquor gathered in the separator will be fed by the line ($k$) to the

92. PAPER MAKING AND
FIBER LIBERATION heat exchanger L in which it will impart its heat units to the fresh liquor which is being forced to the jet eductor I by the pump M. In this way, any heat units left in the side relief liquor is imparted to the fresh liquor leaving the storage tanks G, G'.

During the period of the above mentioned operations, digesters B and C relieve dry gas into the header H, and this gas flows to the jet eductor I where it is contacted with fresh liquor from the storage tank; this fresh liquor being forced under pressure into the jet eductor by means of the pump M. It will be noted that this pump is in continuous operation during cooking, and it acts to force the fresh liquor from the storage tank into the jet eductor I, where the liquor meets the relief fluids from the digesters and condenses them. From the jet eductor, the mixture of fresh liquor in somewhat preheated condition, together with the relief gases and liquor is conducted by the drop leg to the jet eductor O. This eductor is operated by liquor leaving the pump T under pressure, and this pressure liquid forces the mixture through the absorbing legs P to the jet eductor Q which is operated by liquor forced by the pump S. The pumps S and T draw liquor out of the bottom of the accumulator and feed it to the jet eductors O and Q, due to the fact that at this time, the valve in the pipe *r8* is closed. Of course, during the filling of the next digester that comes on, the valve in the pipe *r8* must be opened to allow the pump U to force liquor to that digester, but in actual practice, the pipe *r8* is of such size that it will accommodate the pumps S and T, and U, or if preferred, pumps S and T can be connected on their suction sides to the bottom of the accumulator through a line (not shown) separate from the pipe *r6*.

Heretofore, it has been proposed to employ a jet eductor in the same manner as we operate jet eductor I, but the use of the jet eductors O and Q is new and they serve the purpose of keeping the liquid level in the drop leg *n4* very low, which gives us the equivalent of a much higher drop leg, and therefore, by employing the eductors O and Q, we are able to produce a partial vacuum on the header H, which means that it is much easier to regulate the flow of the relief gases and liquids from the digesters, as each digester is always relieving against a vacuum or sub-pressure which is kept practically constant by the proper manipulation of the regulating valves of the jet eductors.

We have found that the passing of the mixture of fresh liquor and relief fluids through the circuitous pipe P causes these fluids to be thoroughly mixed together before they enter the accumulator, and consequently, we are able to maintain a much more uniform acid in the accumulator. However, in order to assure absolute uniformity, we use liquid $SO_2$ under pressure from the tank X. The control valve of this cylinder is electrically connected as shown at *x4*, *x5* with the liquor in the accumulator, and as the conductivity of the liquor varies with the strength of the same, the current will control the operation of the motor that takes care of the valve *x3*. Therefore, when the liquor strength drops below a predetermined degree, the motor opens the valve *x3* and allows liquid sulphur dioxide to pass through the line *x'* into the bottom of the accumulator, thereby increasing the strength of the acid in the accumulator. Just as soon as this strength has reached a desired predetermined degree, the current flowing through the plates *x5* will automatically shut off the valve *x3*, and of course, this will stop the flow of $SO_2$ from the tank X to the accumulator.

In the event that the temperature in the accumulator falls below a predetermined degree, the thermostatic control (not shown) may be employed to admit steam from the pipe Y directly into the accumulator through *y'* and *r'*, or into the coil Z. Steam from the coil will flow into the trap Z3, and the condensate will pass off into the pipe (*k*) which leads it through the heat exchanger L, whereby it may give up its heat units to the fresh liquor forced by the pump M.

By operating as above described, we can maintain the acid strength in the accumulator practically uniform, and we can also maintain the temperature in the accumulator at approximately any desired degree. Normally, in this way, we can maintain the temperature in the accumulator at about 110° C., and by setting the pop valves *n6* and *n7* so as to maintain a pressure in the accumulator of approximately 70 lbs., we are enabled to maintain the strength and temperature of the acid within narrow limits. We have actually operated with strengths of over 10% free acid.

The pop valve *n6* is preferably set at about 5 lbs. lower in pressure than the pop valve *n7*, and consequently, practically all of the overhead gas from the accumulator discharges through the line *n3* and the check valve *n33* and a side eductor *n44* into the drop leg *n4*. If there is an excess of overhead gas, the valve *n7* acts as a safety device and leads the same through the pipe *n5* back to the suction side of the pump M after it is mixed with the fresh liquor going to the eductor I.

Referring now to the disposal of the blow-pit gases, it will be noted that the pump G6 is continuously operated, and is pumping weak acid liquor out of the tower G2 and feeding this liquor to the jet eductor E in which the liquor absorbs any gas or steam that comes off from the blow-pits. From the eductor, this mixture passes downwardly through the drop leg G8 to the pump G9 from which it is forced into the top of the tower G2. The operation of the towers G2 and G3 is reversible, and normally, the operation is reversed about once a day. The acid tower G2 will be the weak tower one day and the strong tower the next day, while the tower G3 will be the strong acid tower one day and the weak acid tower the next. This is permitted by the valved connections G11, G12, G4, G5 and G13.

By operating the jet eductor E we can produce a partial vacuum on the blow-pit header D, and consequently, on the vomit stacks, and in this way, we can draw out and save all the gases that may be in the liquor which is discharged from the digesters with the pulp when the cooking operation has been completed.

It is not new to condense gases and vapors from the blow-pits, but so far as we are aware, we are the first to employ a jet eductor for this purpose.

By proceeding as described above, it is practical to use cooking acid of a strength as high as 18 to 20% free, and to do this, with great economy. In this way, we are able to reduce the maximum temperature in the digesters to from 115° C. to 120° C., and at the same time we can recover the gases which are in the liquor when the digester is emptied. In passing, we may say that when digesting with such high strength acid at relatively low temperatures, the liquor entering the blow-pits is very high in $SO_2$ content, and it is economical to recover such $SO_2$.

Another method of operation which we have found very successful is to leave the top of the digester closed after charging the same with chips, and then, after pumping a pressure of 70 to 80 lbs. on the liquor in the digester, admit enough steam to maintain this pressure without venting from the top of the digester. If the pressure is held in this way for about two hours at the start of the cook, a superior and pure cellulose is produced. As wood chips normally have a moisture content of from 30 to 60%, the hot acid absorbed by the chips when the digester is pumped causes a drop in pressure after the digester has been completely filled with chips and liquor and pumped to the desired degree. It is believed that the radiation of the heat from the shell causes some of the drop in pressure. In any event, it is a fact that after the pump U is stopped with all valves on the digester closed, there is a perceptible dropping in pressure.

It will be observed that the line N10 in Fig. 2 represents the approximate liquor level in the accumulator just before each digester is pumped. We have found in actual practice that it is very desirable to so regulate the flow of fresh acid liquor by the regulating valve in the eductor I, that by the time the next digester is ready to be filled, the liquor level in the accumulator will be below the top of the accumulator and preferably at least six feet below the usual top flange; the space unoccupied by the liquor being filled with gases and vapors rising from the hot cooking liquor. We have also found it important to so regulate the valve of the eductor I that at the time the next digester is ready for pumping, the liquor level in the accumulator will always be brought to about the same elevation. Of course, after a digester has been pumped, this liquor level is lowered considerably, normally about half the distance from the line N10 to the bottom of the accumulator.

It is quite important in practice that the liquor level in the accumulator be always brought to the same elevation by the time a digester is ready for pumping, providing of course, that the digesters are all of the same size. When the digesters are of dissimilar sizes, this liquid level is determined by the relative size of the oncoming digester, and then the valve in the eductor I is so regulated that the liquid level for each special size is maintained at the time this particular digester is ready for pumping. Each accumulator should be provided with a gauge glass *n'* for use in maintaining the liquid level.

Due to the spacing of the top liquor level substantially below the top of the accumulator, there is a large gas space available in the accumulator above the liquor. We have found that equilibrium as regards the amount of $SO_2$ gas absorbed by the bi-sulphite liquor is actually to a large extent determined by the gas space above the liquor, for with a small gas space, the $SO_2$ gas contained in the liquor will not be proportionate to the pressure. On the other hand, if the gas space is equivalent in volume to not less than 25% of the volume of the liquor in the accumulator, equilibrium as regards the amount of $SO_2$ gas absorbed is established.

Each of the eductors I, O, Q, E is preferably of the type shown in Fig. 4.

As an alternative method of operation, the pump S can force liquor from the bottom of the accumulator through the jet eductor Q, and this will act to draw liquor and gas from the eductor I through a valved pipe N20, directly into the accumulator without using the absorption legs P. In this modification, the side relief and vent gases from each digester flow through the header H to the jet eductor I in which they are contacted with a continuously flowing stream of cold fresh liquor from the acid storage tanks, and then the mixture of relief gases and cold acid liquor flows through the drop leg *n*4, N20, and on its way down, entrains the gas vented from the top of the accumulator through pipe *n*3. The combined mixture flows to the jet eductor Q from which the mixture is forced into the accumulator by the pump S which is circulating hot liquor from the bottom of the accumulator through the eductor Q and its connecting pipes. This action of the eductor Q puts a suction on the drop leg N20 and thereby lowers the liquid level in the drop leg. In this way, we are able to maintain a suction on the main relief header H, whereby the digesters are always operating against a partial vacuum.

During the last end of the cook, it is sometimes advisable to close the valve in the branch (*b*) and at that time, we then open the valve in branch (*c*) and vent low pressure gases through the header F back to the storage tank.

We desire to be understood that the relative dimensions of the parts in the drawings are not accurate, as of course, sizes of parts vary with particular installations.

From the foregoing it is believed that the novel features of our process and apparatus may be readily understood by those skilled in the art, and we are aware that changes may be made in the details disclosed, without departing from the spirit of the invention, as expressed in the claims.

We claim:

1. In a process of the character described, preparing a preheated high acid content cooking liquor, introducing this liquor into a digester containing fibrous material, and pumping such liquor into the digester until the pressure in the latter rises to at least 50 pounds.

2. In a process of the character described, maintaining acid liquor in a closed accumulator at a substantially constant acid strength and at a substantially constant super-atmospheric temperature, and under super-atmospheric pressure, feeding such liquor from the accumulator into a digester containing fibrous materials, and utilizing such liquor in the digester for cooking said fibrous material.

3. In a process of the character described, maintaining in closed accumulator hot cooking liquor having a substantially uniform acid strength and held at a substantially constant super-atmospheric temperature and super-atmospheric pressure, forcing the liquor in this condition into a digester containing fibrous material, and immediately utilizing the liquor in the digester for pre-cooking said fibrous material.

4. In a process of the character described, maintaining in a closed accumulator cooking liquor with a strength of over 10% free acid while holding said liquor in hot condition and under super-atmospheric pressure, feeding the liquor in this condition into a digester containing fibrous material, and immediately utilizing the liquor in said digester for precooking said fibrous material.

5. In a process of the character described, maintaining in a closed accumulator cooking liquor at a temperature of about 110° C. while having PAPER
FIBER LIBERATION
11
Search Roo a relatively high acid strength and held at superatmospheric pressure, feeding the liquor in this condition into a digester containing fibrous material, and immediately utilizing the liquor in the digester for precooking said fibrous material.

6. In a process of the character described, maintaining in a closed accumulator a cooking liquor of high acid strength at a temperature of about 110° C. and under a pressure of approximately 70 pounds, feeding the liquor in such condition into a digester containing fibrous material, and immediately utilizing the liquor in said digester for precooking said fibrous material.

7. In a process of the character described, preparing an acid liquor having a strength of over 10% free acid, bringing the pressure of said liquor up to approximately 70 pounds and bringing the temperature of the liquor up to about 110° C., then introducing the liquor in this condition into a digester containing fibrous material, and utilizing such liquor in the digester for precooking said fibrous material.

8. In a process of the character described, charging a digester with fibrous material, then completely filling the remaining space in the digester with high strength acid cooking liquor in hot condition, then forcing this liquor into the digester to buid up a pressure of approximately 75 pounds therein, closing the top of the digester, and then introducing steam into the digester without venting from the top of the latter, and thereby maintaining said pressure for at least an hour at the start of the cook.

9. In a process of the character described, circulating hot liquor from an accumulator through a jet eductor, forcing colder acid liquor through a second jet eductor, utilizing the liquor flowing through the second jet eductor to withdraw gases and vapors from a digester undergoing cooking, and utilizing the liquor flowing through the first eductor for withdrawing the mixture of acid liquor, gases and vapors discharged from the second jet eductor.

10. In a process of the character described, relieving gases and vapors from a digester against sub-atmospheric pressure maintained within a header, forcing relatively cold fresh acid liquor through an eductor and thereby withdrawing the gases and vapors from the header, discharging the mixture of liquor, gases and vapors from the eductor through a descending passageway, discharging the mixture from said passageway into a second jet eductor, and pumping acid liquor from a pressure accumulator through the second jet eductor back to the accumulator for admixing accumulator liquor with the mixture from said passageway and for maintaining suction conditions within the passageway.

11. In a process of the character described, relieving gases and vapors from a digester against sub-atmospheric pressure maintained within a header, forcing relatively cold fresh acid liquor through an eductor and thereby withdrawing the gases and vapors from the header, discharging the mixture of liquor, gases and vapors from the eductor through a descending passageway, discharging the mixture from said passageway into a second jet eductor, pumping acid liquor from a pressure accumulator through the second jet eductor back to the accumulator for admixing accumulator liquor with the mixture from said passageway and for maintaining suction conditions within the passageway, and venting gases and vapors from the top of the accumulator into said passageway.

12. In a process of the character described, relieving gases and vapors from a digester against sub-atmospheric pressure maintained within a header, forcing relatively cold fresh acid liquor through an eductor and thereby withdrawing the gases and vapors from the header, discharging the mixture of liquor, gases and vapors from the eductor through a descending passageway, discharging the mixture from said passageway into a second jet eductor, pumping acid liquor from a pressure accumulator through the second jet eductor back to the accumulator for admixing accumulator liquor with the mixture from said passageway and for maintaining suction conditions within the passageway, and venting vapors and gases from the top of the accumulator into said passageway when the pressure in the accumulator rises above a predetermined degree.

13. In a process of the character described, relieving gases and vapors from a digester against sub-atmospheric pressure maintained within a header, forcing relatively cold fresh acid liquor through an eductor and thereby withdrawing the gases and vapors from the header, discharging the mixture of liquor, gases and vapors from the eductor through a descending passageway, discharging the mixture from said passageway into a second jet eductor, pumping acid liquor from a pressure accumulator through the second jet eductor back to the accumulator for admixing accumulator liquor with the mixture from said passageway and for maintaining suction conditions within the passageway, and introducing an extraneous heating agent into the accumulator for heating cooking liquor in the latter.

14. In a process of the character described, relieving gases and vapors from a digester against sub-atmospheric pressure maintained within a header, forcing relatively cold fresh acid liquor through an eductor and thereby withdrawing the gases and vapors from the header, discharging the mixture of liquor, gases and vapors from the eductor through a descending passageway, discharging the mixture from said passageway into a second jet eductor, pumping acid liquor from a pressure accumulator through the second jet eductor back to the accumulator for admixing accumulator liquor with the mixture from said passageway, and for maintaining suction conditions within the passageway, and preheating the fresh acid liquor on its way to the first eductor.

15. In a process of the character described, relieving gases and vapors from a digester against sub-atmospheric pressure maintained within a header, forcing relatively cold fresh acid liquor through an eductor and thereby withdrawing the gases and vapors from the header, discharging the mixture of liquor, gases and vapors from the eductor through a descending passageway, discharging the mixture from said passageway into a second jet eductor, pumping acid liquor from a pressure accumulator through the second eductor back to the accumulator for admixing accumulator liquor with the mixture from said passageway and for maintaining suction conditions within the passageway, and introducing $SO_2$ directly into the accumulator for strengthening the liquor in the latter.

16. In a process of the character described, relieving gases and vapors from a digester against sub-atmospheric pressure maintained within a header, forcing relatively cold fresh acid liquor through an eductor and thereby withdrawing the gases and vapors from the header, discharging the mixture of liquor, gases and vapors from the eductor through a descending passageway, discharging the mixture from said passageway into a second jet eductor, pumping acid liquor from a pressure accumulator through the second jet eductor back to the accumulator for admixing accumulator liquor with the mixture from said passageway, and utilizing the condition of the liquor in the accumulator for introducing $SO_2$ into the acid liquor.

17. In a process of the character described, relieving gases and vapors from a digester against sub-atmospheric pressure maintained within a header, forcing relatively cold fresh acid liquor through an eductor and thereby withdrawing the gases and vapors from the header, discharging the mixture of liquor, gases and vapors from the eductor through a descending passageway, discharging the mixture from said passageway into a second jet eductor, pumping acid liquor from a pressure accumulator through the second jet eductor back to the accumulator for admixing accumulator liquor with the mixture from said passageway and for maintaining suction conditions within the passageway, and mixing fresh $SO_2$ with the liquor on its way to the accumulator.

18. In a process of the character described, forcing fresh acid liquor through a passageway into a pressure accumulator, mixing said liquor in said passageway with vent fluids from a digester, venting gases and vapors from the accumulator after a predetermined pressure is reached in the accumulator, and introducing the vent gases and vapors into the liquor in the passageway after said liquor has been mixed with said vent fluids from a digester.

19. In a process of the character described, passing fresh acid liquor through a passageway having an interposed heat exchanger and pump, utilizing waste heat units from a digesting operation to heat said heat exchanger, and discharging preheated acid liquor from said passageway into a pressure accumulator.

20. In a process of the character described, pumping fresh acid liquor from an acid storage tank through a passageway into a pressure accumulator, utilizing liquor flowing through said passageway to withdraw vent gases and vapors from a digester during a cooking operation, circulating acid liquor from the accumulator through a portion of said passageway, and utilizing suction created by the circulation of the accumulator liquor for maintaining sub-atmospheric conditions in a portion of said passageway.

21. In a process of the character described, digesting fibrous material with relatively high strength acid liquor, discharging the fibrous material and liquor into a blow-pit after the completion of the cooking operation, introducing gases and vapors from the blow-pit into a jet eductor, and forcing relatively weak acid liquor from an acid tower through said eductor and back to the tower and thereby absorbing the gases and vapors discharged from the blow-pit.

22. In a process of the character described, feeding fresh acid liquor into a pressure accumulator, discharging vent gases and vapors from a digester during a cooking operation, separating condensates from the vented fluids and utilizing said condensates for preheating the acid liquor fed to the accumulator.

23. In a process of the character described, feeding fresh acid liquor into a pressure accumulator, introducing steam into said accumulator, and utilizing condensates from said steam for preheating acid liquor flowing to the accumulator.

24. An apparatus of the character described, comprising an accumulator, a separator, a conduit for feeding vent fluid from the top of the digester to the separator, a pressure accumulator, a pipe line for feeding fresh acid liquor to the accumulator, a heat exchanger interposed in said pipe line, and means for feeding hot condensates from the separator through said heat exchanger.

25. An apparatus of the character described, comprising a digester blow-pit, a jet eductor, means for forcing acid liquor through said jet eductor, a vent conduit connecting the blow-pit to the jet eductor, and means for feeding mixed fluids from the jet eductor to an acid tower.

26. An apparatus of the character described, comprising a plurality of acid towers, a jet eductor, means for withdrawing acid liquor from either one of said towers and for forcing the same through said jet eductor, a digester blow-pit, a conduit for feeding vent gases and vapors from the blow-pit to the jet eductor, and means for conveying mixed fluids from the eductor to either one of said acid towers.

27. An apparatus of the character described, comprising a plurality of acid towers, a jet eductor, means for withdrawing acid liquor from either one of said towers and for forcing the same through said jet eductor, a digester blow-pit, a conduit for feeding vent gases and vapors from the blow-pit to the jet eductor, means for conveying mixed fluids from the eductor to either one of said acid towers, and a pump interposed in the last mentioned conveying means for exerting suction on the outlet of the eductor.

28. An apparatus of the character described, comprising a digester, an acid liquor storage tank, a vent outlet for the digester, a valved air vent connected to said outlet, and means for leading cold acid vent through said outlet to said storage tank.

29. An apparatus of the character described, comprising a pressure accumulator, a passageway for feeding fresh acid liquor to the accumulator, a first jet eductor interposed in said passageway, a digester system vent header connected to said jet eductor, a second jet eductor interposed in said passageway between the first eductor and the point where the passageway discharges into the accumulator, and means for pumping acid liquor from the accumulator through said second jet eductor.

30. An apparatus of the character described, comprising a pressure accumulator, a passageway for feeding fresh acid liquor to the accumulator, a first jet eductor interposed in said passageway, a digester system vent header connected to said jet eductor, a second jet eductor interposed in said passageway between the first eductor and the point where the passageway discharges into the accumulator, means for pumping acid liquor from the accumulator through said second jet eductor, and means for leading vent gases from the top of the accumulator into said passageway at a point anterior to the first eductor.

31. An apparatus of the character described, comprising a pressure accumulator, a passageway for feeding fresh acid liquor to the accumulator, a first jet eductor interposed in said passageway, a digester system vent header connected to said jet eductor, a second jet eductor interposed in said passageway between the first eductor and the point where the passageway discharges into the accumulator, means for pumping acid liquor from the accumulator through said second jet 92. PAPER MAKING AND
FIBER LIBERATION
11
Search Room eductor, and means for feeding vent fluids from the top of the accumulator into said passageway at a point posterior to the first eductor.

32. An apparatus of the character described, comprising a pressure accumulator, a passageway for feeding fresh acid liquor to the accumulator, a first jet eductor interposed in said passageway, a digester system vent header connected to said jet eductor, a second jet eductor interposed in said passageway between the first eductor and the point where the passageway discharges into the accumulator, means for pumping acid liquor from the accumulator through said second jet eductor, and valve controlled means for feeding $SO_2$ into the accumulator.

33. An apparatus of the character described, comprising a pressure accumulator, a passageway for feeding fresh acid liquor to the accumulator, a first jet eductor interposed in said passageway, a digester system vent header connected to said jet eductor, a second jet eductor interposed in said passageway between the first eductor and the point where the passageway discharges into the accumulator, means for pumping acid liquor from the accumulator through said second jet eductor, a liquid $SO_2$ tank, and valve controlled means for feeding $SO_2$ from said tank into the acid liquor.

34. An apparatus of the character described, comprising a pressure accumulator, a passageway for feeding fresh acid liquor to the accumulator, a first jet eductor interposed in said passageway, a digester system vent header connected to said jet eductor, a second jet eductor interposed in said passageway between the first eductor and the point where the passageway discharges into the accumulator, means for pumping acid liquor from the accumulator through said second jet eductor, and means for heating the interior of said accumulator.

35. In a process of the character described, maintaining in a closed accumulator hot cooking liquor having a substantially uniform acid strength and held at a substantially constant super-atmospheric temperature and super-atmospheric pressure, and utilizing the strength of the liquor in the accumulator to control the admission of $SO_2$ into said liquor.

36. In a process of the character described, maintaining in a closed accumulator hot cooking liquor having a substantially uniform acid strength and held at a substantially constant super-atmospheric temperature and super-at mospheric pressure, and utilizing temperature existing in the accumulator to control the admission of a heating agent into said accumulator for heating said liquor.

37. In a process of the character described, maintaining in a closed accumulator, hot cooking liquor having a substantially uniform acid strength and held at a substantially constant super-atmospheric temperature and super-atmospheric pressure, and preventing the liquor in the accumulator from rising above a predetermined level so as to maintain a relatively large gas space in the accumulator above the liquor.

38. The combination with a battery of digesters and means for recovering acid and the heat units thereof when vented from the digesters, of a header operatively connected to the upper ends of the digesters for receiving fluids released therefrom, and means for maintaining a substantially constant vacuum in said header.

39. In an apparatus of the character described, a pressure accumulator, a passageway for feeding acid liquor to the accumulator, a first jet eductor interposed in said passageway, a second jet eductor interposed in said passageway between the first eductor and the point where the passageway discharges into the accumulator, and a plurality of digesters having a single common relief header connecting with the accumulator through the first eductor.

40. In a process of the character described, circulating hot liquor to and from a pressure accumulator through a jet eductor, and introducing fresh cooler acid into the accumulator through said eductor.

41. In a process of the character described, circulating hot liquor directly to and from a pressure accumulator through an eductor and introducing a mixture of cooler acid and relief gases into the accumulator through said eductor.

42. In a process of the character described, circulating hot liquor directly to and from a pressure accumulator through a jet eductor and introducing a mixture of cooler acid and digester relief fluids into the accumulator through said eductor.

43. In a process of the character described, forcing fresh acid liquor in admixture with digester relief fluids through a descending passageway, circulating relatively hot acid liquor directly to and from a pressure accumulator through a jet eductor, and introducing the materials from said passageway into the said recirculating stream through a jet eductor.

44. In a process of the character described, passing fresh acid liquor through a passageway having an interposed heat exchanger and pump, utilizing waste heat units from a digesting operation to heat said heat exchanger, and discharging preheated acid liquor from said passageway into a pressure accumulator through a jet eductor and recirculating a stream of acid to and from the accumulator through a circuit which includes the eductor.

45. In a process of the character described, passing fresh acid liquor through a passageway having an interposed heat exchanger, utilizing liquor flowing through said passageway to withdraw gases and vapors from a digester during a cooking operation, circulating acid liquor directly to and from a pressure accumulator and through a portion of the passageway.

46. In a process of the character described, establishing in a pressure accumulator a volume of hot preconditioned cooking liquor, recirculating a stream of acid to and from the accumulator and utilizing such stream to withdraw digester fluids, and automatically controlling the temperature of the acid within the accumulator at an optimum value.

47. In a process of the character described, establishing in a pressure accumulator a volume of hot acid, recirculating such acid directly to and from the accumulator through an external circuit including an eductor, and controlling pressure conditions within the accumulator by venting gases from the upper portion thereof and introducing them into said recirculating circuit.

48. In a process of the character described, establishing in a pressure accumulator a volume of hot acid, recirculating such acid directly to and from the accumulator through an external circuit including an eductor, and utilizing the suction created by the circulation of the liquor through the eductor to withdraw vent fluids from a digester and overhead gases from the said accumulator.

49. In the process of digesting fibrous materials to produce chemical pulp, establishing a volume of hot acid liquor in a pressure accumulator, maintaining a predetermined pressure on the material therein, providing a source of acid gas and automatically admitting predetermined quantities of such gas to the liquor in the accumulator in response to the acid concentration condition of the liquor.

THOMAS L. DUNBAR.
ALBERT D. MERRILL.